Dec. 26, 1967   R. PRINCE   3,359,942
FLUID APPLICATOR FOR FEED PRODUCTS
Filed Dec. 28, 1964   2 Sheets-Sheet 1

INVENTOR.
RICHARD PRINCE
BY
Duck & Barley
ATTORNEYS

Dec. 26, 1967 R. PRINCE 3,359,942
FLUID APPLICATOR FOR FEED PRODUCTS
Filed Dec. 28, 1964 2 Sheets-Sheet 2
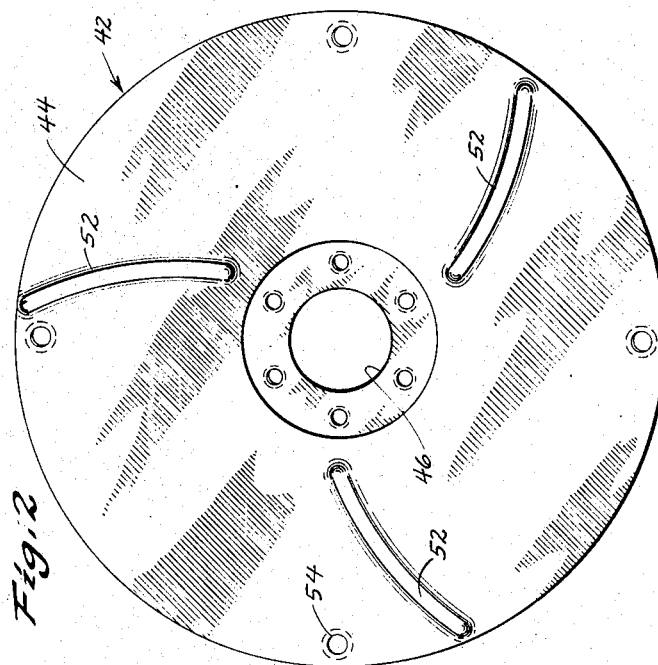
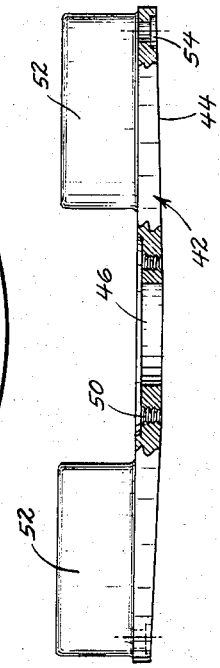
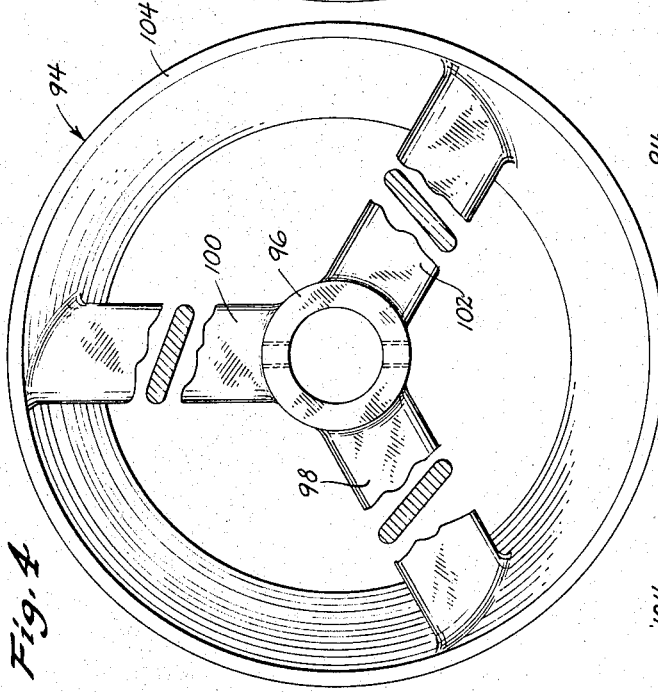
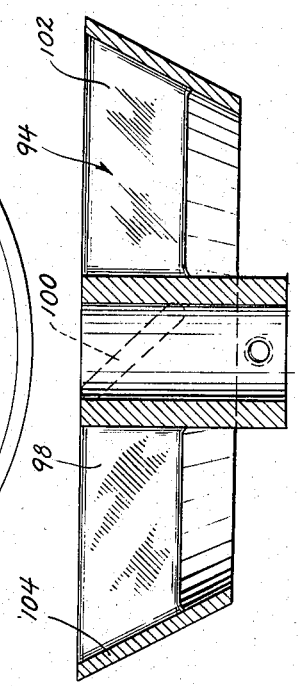
INVENTOR.
RICHARD PRINCE
BY Dick & Zarley
ATTORNEYS

3,359,942
FLUID APPLICATOR FOR FEED PRODUCTS
Richard Prince, 10001 S. St. Marys,
Sioux City, Iowa 51106
Filed Dec. 28, 1964, Ser. No. 421,555
3 Claims. (Cl. 118—303)

This invention relates to a feed manufacturing process and more particularly to a device that is adapted to coat feed particles with a fluid such as molasses.

Therefore, a principal object of this invention is to provide a fluid applicator for feed products that can create an atomized mist of fluid particles without the use of nozzle elements.

A further object of this invention is to provide a fluid applicator for feed products that can successfully coat feed particles with a fluid such as molasses whereby the resultant feed mass will not tend to coagulate.

A further object of this invention is to provide a fluid applicator for feed products that will efficiently provide an atomized mist of fluid particles without also creating a collection of fluid that fails to become atomized.

A further object of this invention is to provide a fluid applicator for feed products whereby the quantity of fluid being atomized can be selectively controlled.

A still further object of this invention is to provide a fluid applicator for feed products which can be easily cleaned.

A further object of this invention is to provide a fluid applicator for feed products that can serve to atomize any viscous liquid.

A further object of this invention is to provide a fluid applicator for feed products wherein the feed to be coated is directed onto a slinger means which directs the feed outwardly and downwardly therefrom to be coated with the atomized mist.

A further object of this invention is to provide a fluid applicator for feed products wherein the feed to be coated is directed onto a slinger means and onto a spinner means which combine to disperse the feed for subsequent coating with the atomizing mist.

A further object of this invention is to provide a fluid applicator for feed products which is economical of manufacture, durable in use and refined in appearance.

These and other objects will be apparent to those skilled in the art.

The invention consists in the construction, arrangements, and combination of the various parts of the device, whereby the objects contemplated are attained as hereinafter more fully set forth, specifically pointed out in the claims, and illustrated in the accompanying drawings, in which:

FIG. 2 is a top view of the spinner means;

FIG. 3 is an end elevational view of the device seen in FIG. 2 with portions thereof cut away to more fully illustrate the invention;

FIG. 4 is a top elevational view of the slinger means with portions of the vanes thereof cut away to more fully illustrate the invention; and FIG. 5 is a sectional view of the device seen on line 5—5 of FIG. 4.

Figure 1:
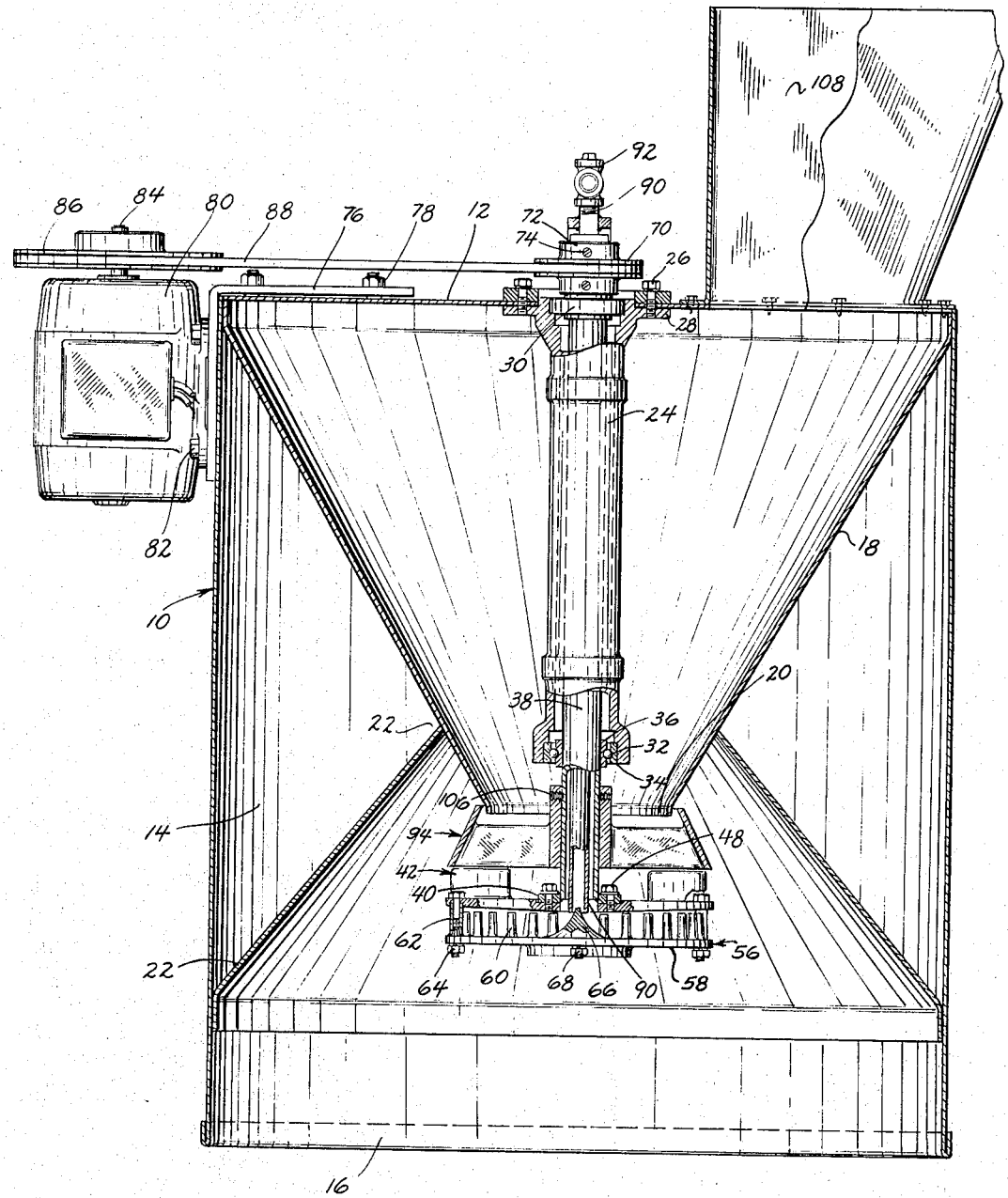
FIG. 1 is a side elevational view of the device having portions thereof cut away to more fully illustrate the invention.

The numeral 10 generally designates a hollow circular drum having a top 12, side wall 14 and an open bottom 16.

An inverted frusto-conical shaped hopper means 18 is secured to the interior of drum 10 adjacent the upper end thereof and extends downwardly and inwardly as seen in FIG. 1 and has an open bottom end 20. A frusto-conical shaped member 22 is secured to the interior of drum 10 upwardly of its bottom end and extends upwardly and inwardly so that its upper end 22 surrounds hopper means 18 adjacent its lower end as seen in FIG. 1.

An elongated hollow support tube 24 has its upper end extending through a suitable aperture in the center of the top 12 of drum 10. Bolt and nut assemblies 26 utilize registering holes in top 12 and flange 28 to effect the rigid connection of the support tube 24 on the vertical longitudinal axis of the drum 10.

Conventional bearing elements 30 and 32 are rigidly secured with the upper and lower ends, respectively, of support tube 24. Bearing elements 30 and 32 are comprised of stationary outer rings 34 which are rigidly affixed to tube 24, and movable inner rings 36 which are rigidly secured in any convenient manner to the upper and lower ends of drive tube 38. Rings 34 and 36 are separated by conventional ball bearing assemblies.

Drive tube 38 extends downwardly below the lower end of support tube 24 and has a ring 40 welded to its extreme lower end as seen in FIG. 1. A spinner means 42 comprised of a circular plate 44 having a central opening 46 is secured to ring 40 by means of bolt members 48 threadably extending through holes 50 in circular plate 44 as seen in FIG. 1. Circular plate 44 has a plurality of upstanding blades 52 which are arcuately formed along their length as seen in FIG. 2. Circular plate 44 is provided with a plurality of holes 54 adjacent its periphery. A spindle 56 comprised of a horizontal circular plate 58 and has a plurality of vertical pins 60 extending upwardly about the periphery thereof. Pins 60 are circular in cross-section. Four hollow posts 62 extend upwardly from the four points on the periphery of plate 58 to a height slightly greater than that of pins 60. Bolt and nut assemblies 64 utilize posts 62 and holes 54 in plate 44 to effect the rigid connection of the spindle 56 to plate 44 of spinner means 42 as seen in FIG. 1. A vertical cone element 66 having arcuate sides which ride from a tangential position with respect to the top surface of plate 58 is symmetrically located in the center of plate 58 and maintained thereon by means of bolt assembly 68 extending through plate 58 as seen in FIG. 1.

A drive pulley 70 is rigidly mounted on collar 72 which in turn is rigidly secured about the upper end of drive tube 38 by means of set screws 74. An L-shaped bracket 76 is counted on top 12 of drum 10 by bolt and nut assemblies 78. An electric motor 80 is mounted on bracket 76 by bolt and nut assemblies 82 and the vertical power shaft 84 of motor 80 has a pulley 86 rigidly secured thereto in the same horizontal plane as pulley 70. The belt 88 connects pulleys 86 and 70 whereby drive tube 38 is rotated when motor 80 is electrically excited.

A feed tube 90 extends downwardly through drive tube 38 and has its lower end terminating on a horizontal plane below that of the vertex of cone 66 as seen in FIG. 1. Feed tube 90 extends upwardly from the upper end of drive tube 38 and is prevented from vertical movement by any convenient means such as by journaling feed tube 90 at its upper and lower ends in the inner rings 36 of bearing elements 30 and 32. The upper end of feed tube 90 is provided with a conventional pipe connection means 92.

A slinger means 94 having a central hub portion 96 with vane members 98, 100 and 102 extend outwardly therefrom to a frusto-conical shaped rim member 104. Hub portion 96 is rigidly secured to drive tubes 38 by means of set screws 106. It should be noted that the pitch of vane member 98 is opposite to that of vane members 100 and 102.

Extending upwardly from top 12 of drum 10 is a conduit 108, the interior of which is in communication with the interior of hopper means 18 for supplying feed material to the interior of hopper 18.

The normal operation of the device is as follows. The energization of motor 80 causes the rotation of drive tube 38 by means of the rotating pulleys 86 and 70 and the connecting belt 88. Support tube 24 remains stationary, as does the feed tube 90, but the drive tube 38 rotates the spindle 56, spinner 42 and slinger 94 on the lower end thereof. Molasses or other desirable viscous liquids can be introduced into the top of stationary feed tube 90 by gravity or controlled pressure. The liquid proceeds downwardly through feed tube 90 and engages the cone element 66 on spindle 56. The downwardly descending fluid impinges on the rapidly rotating cone element 66 and the stream of fluid is thereupon thrown outwardly against the rotating pins 60. The high speed impact between the pin 60 and the fluid causes the fluid to break up into fine particles which creates a fine mist or fog in the bottom of the frusto-conical shaped member 22. At the same time, ground corncobs, alfalfa, or the like, can be introduced into hopper means 18 by means of conduit 108. Hopper means 18 funnels the feed particles downwardly and inwardly and discharges the same onto the rotating slinger means 94. Vanes 98, 100 and 102 buffet the downwardly descending feed and deposit the same on the rotating spinner means 42. It has been found that by providing at least one vane member with a pitch opposite to that of the remaining vanes more satisfactorily produces the buffeting action desired. Rim 104 prevents the feed particles from being thrown outwardly from vanes 98, 100 and 102 because the upper end of rim 104 extends above the lower end of hopper means 18 as clearly seen in FIG. 1. The blades 52 on the upper surface of spinner means 42 impels the downwardly descending feed particles outwardly to the frusto-conical shaped member 22 whereupon it passes through the mist created by spindle means 56. As the feed particles pass through the mist created by spindle means 56, the feed particles become coated with the fluid and the resultant feed mass is free from dust and stickines. It has been found that as much as 20% molasses by weight can be added to ground hay or whole corn with the device without adversely effecting the resultant feed mass.

The device can be easily cleaned by running water through its various parts, and disassembly, if ever needed, is easily accomplished. Thus it can be seen that the device accomplishes at least all of its stated objectives.

Some changes may be made in the construction and arrangement of my fluid applicator for feed products without departing from the real spirit and purpose of my invention, and it is my intention to cover by my claims, any modified forms of structure or use of mechanical equivalents which may be reasonably included within their scope.

I claim:

1. In a fluid applicator for feed products, an inverted, hollow, frusto-conical shaped hopper means, a hollow, frusto-conical shaped member having its upper end receiving the lower end of said hopper means, a hollow support tube secured to the upper end of said hopper means and extending downwardly into said hopper means and said frusto conical shaped member, a drive tube rotatably mounted within said support tube having its upper end extending above the upper end of said support tube and its lower end extending below the lower end of said tube and the lower end of said hopper means, a spindle secured to the lower end of said drive tube, said spindle including a horizontal plate; a plurality of pins extending substantially vertically upwardly from the periphery of said plate; a cone element on said plate between said pins and having its vertex spaced above said plate and in the center thereof, a hollow feed tube extending through said drive tube and having its lower end terminating adjacent said cone at its vertex thereof and its upper end terminating above the upper end of said drive tube, said feed tube adapted to supply a liquid substance to said cone element, a slinger embracing said drive tube below the lower end of said hopper means and comprised of a central hub portion having a plurality of vane members radially extending outwardly therefrom to a frusto conical shaped rim member, a spinner embracing said drive tube below said slinger and above said spindle and comprised of a horizontal, circular plate member having a plurality of upstanding, arcuate, blades on its upper surface, power means operatively connected to the upper end of said drive tube to rotate said drive tube, spinner, slinger and spindle, said hopper means having an opening therein for introducing a feed substance into the interior thereof whereby the feed substance will be discharged from said hopper means at its lower end onto said slinger.

2. The device of claim 1 wherein one of said slinger vane members has a pitch opposite to the pitch of the other vane members.

3. The device of claim 1 wherein the upper edge of said frusto conical rim member is positioned above and outwardly of the lower end of said hopper means.

References Cited

UNITED STATES PATENTS

| | | | |
|---|---|---|---|
| 1,753,019 | 4/1930 | Page | 239—224 |
| 2,766,872 | 10/1956 | Pillsbury | 275—15 X |
| 3,080,122 | 3/1963 | Cordua | 239—224 |
| 3,155,542 | 11/1964 | Cordell et al. | 118—303 |

FOREIGN PATENTS

| | | |
|---|---|---|
| 444,833 | 3/1936 | Great Britain. |

CHARLES A. WILLMUTH, *Primary Examiner.*

J. P. McINTOSH, *Assistant Examiner.*